(12) United States Patent
Shibata et al.

(10) Patent No.: US 9,316,862 B2
(45) Date of Patent: Apr. 19, 2016

(54) BACKLIGHT DEVICE, LIQUID CRYSTAL DISPLAY DEVICE, AND ELECTRONIC APPARATUS

(75) Inventors: Hirokazu Shibata, Tokyo (JP); Tatsuya Ode, Tochigi (JP)

(73) Assignee: Sony Corporation, Tokyo (JP)

( * ) Notice: Subject to any disclaimer, the term of this patent is extended or adjusted under 35 U.S.C. 154(b) by 535 days.

(21) Appl. No.: 11/769,394

(22) Filed: Jun. 27, 2007

(65) Prior Publication Data
US 2008/0111949 A1    May 15, 2008

(30) Foreign Application Priority Data

Jun. 30, 2006 (JP) ................................. 2006-182029
Jan. 23, 2007 (JP) ................................. 2007-013149

(51) Int. Cl.
*G02F 1/1335* (2006.01)
*G09F 13/04* (2006.01)

(52) U.S. Cl.
CPC .... *G02F 1/133603* (2013.01); *G02F 1/133606* (2013.01); *G02F 1/133608* (2013.01)

(58) Field of Classification Search
CPC .................. G02F 1/133603; G02F 1/133606; G02F 1/133605; G02F 2001/133612
USPC ..................... 349/64, 67, 161; 362/97.1–97.3
See application file for complete search history.

(56) References Cited

U.S. PATENT DOCUMENTS

| | | | |
|---|---|---|---|
| 2004/0095524 A1* | 5/2004 | Date et al. ........................ | 349/89 |
| 2004/0218390 A1* | 11/2004 | Holman et al. ................ | 362/245 |
| 2005/0007516 A1* | 1/2005 | Hong et al. ...................... | 349/64 |
| 2005/0088586 A1* | 4/2005 | Mori et al. ...................... | 349/62 |
| 2006/0006404 A1* | 1/2006 | Ibbetson et al. ................ | 257/99 |
| 2006/0203143 A1* | 9/2006 | Shin ................................ | 349/58 |
| 2006/0215386 A1* | 9/2006 | Hatanaka et al. ............... | 362/29 |
| 2007/0019419 A1* | 1/2007 | Hafuka et al. ................. | 362/373 |

(Continued)

FOREIGN PATENT DOCUMENTS

| | | |
|---|---|---|
| JP | 2002 216525 | 8/2002 |
| JP | 2005-352427 | 12/2005 |
| JP | 2006 058487 | 3/2006 |
| JP | 2006 128129 | 5/2006 |

(Continued)

OTHER PUBLICATIONS

Sony Corporation; Japanese Application No. 2007-013149; Office action dated Mar. 15, 2011; 3 pages.

*Primary Examiner* — Paul Lee
(74) *Attorney, Agent, or Firm* — Sheridan Ross P.C.

(57) ABSTRACT

A backlight device illuminates a transmissive liquid crystal panel from a rear surface thereof, and includes light source substrates, a reflecting sheet, a diffusing-guiding plate, and an optical-function-sheet layered body. The substrates have light-emitting elements for illuminating illumination light. The reflecting sheet has the substrates mounted to one surface thereof, has an opening formed in correspondence with the light-emitting elements, allows the light-emitting elements to be exposed at another surface of the reflecting sheet from the opening, and reflects the illumination light from the light-emitting elements by the another surface. The plate faces the another surface side of the sheet at a predetermined interval from the reflecting sheet, and diffuses in a layer thereof the illumination light incident from the reflecting sheet. The layered body is combined to the plate, includes laminated optical function sheets, and guides the illumination light to the panel.

20 Claims, 8 Drawing Sheets

(56) References Cited

U.S. PATENT DOCUMENTS

2007/0103908 A1* 5/2007 Tabito et al. .................. 362/294
2008/0137335 A1* 6/2008 Tsai et al. ..................... 362/247

FOREIGN PATENT DOCUMENTS

| WO | WO 2005/028950 A1 * | 3/2005 |
| WO | WO 2006/013760 A1 * | 2/2006 |

* cited by examiner

BACKLIGHT DEVICE, LIQUID CRYSTAL DISPLAY DEVICE, AND ELECTRONIC APPARATUS

CROSS REFERENCES TO RELATED APPLICATIONS

The present invention contains subject matter related to Japanese Patent Application JP 2006-182029 and Japanese Patent Application JP 2007-013149 filed in the Japanese Patent Office on Jun. 30, 2006 and on Jan. 23, 2007, respectively, the entire contents of which are incorporated herein by reference.

BACKGROUND OF THE INVENTION

1. Field of the Invention

The present invention relates to a backlight device that illuminates a transmissive liquid crystal panel, and a liquid crystal display device and an electronic apparatus including the backlight device.

2. Description of the Related Art

A liquid crystal display device optically displays, for example, a predetermined image by changing light transmittance as a result of changing the orientation of liquid crystal molecules by applying voltage when liquid crystals are provided between two transparent substrates. Since the liquid crystals, themselves, are not light emitters, the liquid crystal display device is provided with, for example, a backlight device that illuminates a back surface side of a liquid crystal panel with illumination light from a light source, such as a cold cathode fluorescent lamp (CCFL) or a light-emitting diode (LED).

In the backlight device, the liquid crystal panel is illuminated from its back surface side with illumination light from a light source including a plurality of light-emitting diodes, and each optical sheet performs optical operations on the illumination light, such as diffusing, reflecting, and guiding the illumination light. As a result, the liquid crystal panel is uniformly and stably illuminated with the illumination light over its entire surface.

For example, in a backlight device disclosed in Japanese Unexamined Patent Application Publication No. 2005-352427 (Patent Document 1), each light source substrate is mounted to one surface of a back chassis, which is a basic structure of the backlight device, and a reflecting sheet is provided so as to face and so as to be separated from the back chassis. Therefore, the backlight device disclosed in Patent Document 1 has a double bottom structure formed by the back chassis and the reflecting sheet, thereby making the structure complicated and increasing the weight of the backlight device.

In the backlight device disclosed in Patent Document 1, the reflecting sheet exists directly above a first surface of each light source substrate, and a heat plate is mounted to a second surface of each light source substrate. Therefore, in a limited narrow space between the first surface of each light source substrate and the facing reflecting sheet provided directly above the first surface of each light source substrate, a plurality of light-emitting diodes, a wiring pattern, used to wire the light-emitting diodes in series, and wiring parts, such as light source harnesses or connectors, are mounted to the first surfaces of the light source substrates, thereby limiting the degree of design freedom.

In addition, in the backlight device disclosed in Patent Document 1, the light source substrates are cooled in the following manner. Heat generated by the light-emitting diodes is moved to a heat sink through a heat pipe by the heat plate, which is mounted to each of the light source substrates, to cool the generated heat by, for example, a cooling fan. However, since the cooling method depends upon heat conduction, through, for example, the heat plate, its cooling efficiency depends upon, for example, the method of mounting the light source substrates. Further, since the light source substrates, the heat plate, the heat pipe, the heat sink, etc. are formed using aluminum material, they are heavy, difficult to process, and are expensive.

SUMMARY OF THE INVENTION

Accordingly, it is desirable to provide a backlight device which has a simple structure, which uses fewer parts, and which can be made light, and a liquid crystal display device and an electronic apparatus including the backlight device.

In addition, it is desirable to provide a backlight device which can efficiently cool heat generated from light-emitting diodes using a simple structure, and a liquid crystal display device including the backlight device.

According to an embodiment of the present invention, there is provided a backlight device that illuminates a transmissive liquid crystal panel from a rear surface side thereof and that includes a plurality of light source substrates, a reflecting sheet, a diffusing-guiding plate, and an optical-function-sheet layered body. The plurality of light source substrates has a plurality of light-emitting elements for illuminating illumination light. The reflecting sheet has the plurality of light source substrates mounted to one surface of the reflecting sheet, has an opening formed at a location in correspondence with the light-emitting elements mounted to the light source substrates, allows the light-emitting elements to be exposed at another surface of the reflecting sheet from the opening, and reflects the illumination light from the light-emitting elements by the another surface. The diffusing-guiding plate faces the another surface side of the reflecting sheet at a predetermined interval from the reflecting sheet, and diffuses in a layer thereof the illumination light incident from the reflecting sheet. The optical-function-sheet layered body is combined to the diffusing-guiding plate, includes a plurality of laminated optical function sheets, and guides the illumination light to the transmissive liquid crystal panel.

According to another embodiment of the present invention, there is provided a liquid crystal display device including a transmissive liquid crystal panel and a backlight device that illuminates the transmissive liquid crystal panel from a rear surface side thereof.

According to still another embodiment of the present invention, there is provided a backlight device that supplies illumination light to a transmissive liquid crystal panel, and that includes a plurality of light source substrates, a reflecting sheet, a diffusing-guiding plate, and an optical-function-sheet layered body. The plurality of light source substrates have a plurality of light-emitting elements for illuminating the illumination light. The reflecting sheet has a first surface, a second surface, and a plurality of openings. The first surface has the plurality of light source substrates provided thereon. The second surface is disposed opposite to the first surface and reflects the illumination light emitted from the plurality of light-emitting elements. The openings connect the first and second surfaces and are disposed in correspondence with the light-emitting elements so as to allow the light-emitting elements to be exposed from the second surface. The diffusing-guiding plate is provided so as to directly face the second surface of the reflecting sheet at a predetermined distance from the second surface, and diffuses the illumination light emitted from the light-emitting elements and the illumination light incident from the second surface of the reflecting sheet in an interior of the diffusing-guiding plate. The optical-function-sheet layered body is combined to the diffusing-guiding plate, includes a plurality of laminated optical function sheets, and guides the illumination light to the liquid crystal panel.

Here, "directly face" means that there is no other member between the reflecting sheet and the diffusing-guiding plate separating them. By virtue of this structure, since each light source substrate is provided at the first surface of the reflecting sheet so that each light-emitting element is exposed from the second surface, a member for holding each light source substrate required in a related backlight device is no longer required. Therefore, the backlight device is thinner, lighter, and less expensive. In addition, since the reflecting sheet and the diffusing-guiding plate directly face each other, thereby making it unnecessary to provide another member, such as a diffusing plate, between them, it is possible to make the backlight device even thinner, lighter, and less expensive.

According to still another embodiment of the present invention, there is provided a liquid crystal display device including a transmissive liquid crystal panel and a backlight device that supplies illumination light to the liquid crystal panel. The backlight device includes a plurality of light source substrates, a reflecting sheet, a diffusing-guiding plate, and an optical-function-sheet layered body. The plurality of light source substrates have a plurality of light-emitting elements for illuminating the illumination light. The reflecting sheet has a first surface, a second surface, and a plurality of openings. The first surface has the plurality of light source substrates provided thereon. The second surface is disposed opposite to the first surface and reflects the illumination light emitted from the plurality of light-emitting elements. The openings connect the first and second surfaces and are disposed in correspondence with the light-emitting elements so as to allow the light-emitting elements to be exposed from the second surface. The diffusing-guiding plate is provided so as to directly face the second surface of the reflecting sheet at a predetermined distance from the second surface, and diffuses the illumination light emitted from the light-emitting elements and the illumination light incident from the reflecting sheet in an interior of the diffusing-guiding plate. The optical-function-sheet layered body is combined to the diffusing-guiding plate, includes a plurality of laminated optical function sheets, and guides the illumination light to the liquid crystal panel.

According to still another embodiment of the present invention, there is provided an electronic apparatus including a transmissive liquid crystal panel, a backlight device, and a cooling unit that cools a plurality of light source substrates. The backlight device includes the plurality of light source substrates, a reflecting sheet, a diffusing-guiding plate, and an optical-function-sheet layered body. The plurality of light source substrates has a plurality of light-emitting elements for illuminating illumination light that is supplied to the liquid crystal panel. The reflecting sheet has a first surface, a second surface, and a plurality of openings. The first surface has the plurality of light source substrates provided thereon. The second surface is disposed opposite to the first surface and reflects the illumination light emitted from the plurality of light-emitting elements. The openings connect the first and second surfaces and are disposed in correspondence with the light-emitting elements so as to allow the light-emitting elements to be exposed from the second surface. The diffusing-guiding plate is provided so as to directly face the second surface of the reflecting sheet at a predetermined distance from the second surface, and diffuses the illumination light emitted from the light-emitting elements and the illumination light incident from the reflecting sheet in an interior of the diffusing-guiding plate. The optical-function-sheet layered body is combined to the diffusing-guiding plate, includes a plurality of laminated optical function sheets, and guides the illumination light to the liquid crystal panel.

Here, the electronic apparatus is, for example, a television receiver or a personal computer (PC). As the cooling unit, various units, such as a cooling fan, a heat pipe, or a heat sink, may be used. The cooling unit may be provided at a light-source-substrate side or at an inner surface of a housing that holds the liquid crystal panel and the backlight device.

According to the invention, a plurality of light source substrates, having light-emitting diodes that emit illumination light, are mounted to one surface (first surface) of the reflecting sheet that can be used as a basic structure of a backlight unit and that can reflect the illumination light emitted from each light-emitting diode, so that it is possible for the backlight device to have a simpler structure, use fewer parts, and to be lighter.

DESCRIPTION OF THE PREFERRED EMBODIMENTS

A backlight device, a liquid crystal display device, and an electronic apparatus to which the present invention is applied will hereunder be described with reference to the drawings.

First Embodiment

A first embodiment according to the present invention will be described.

Figure 1:
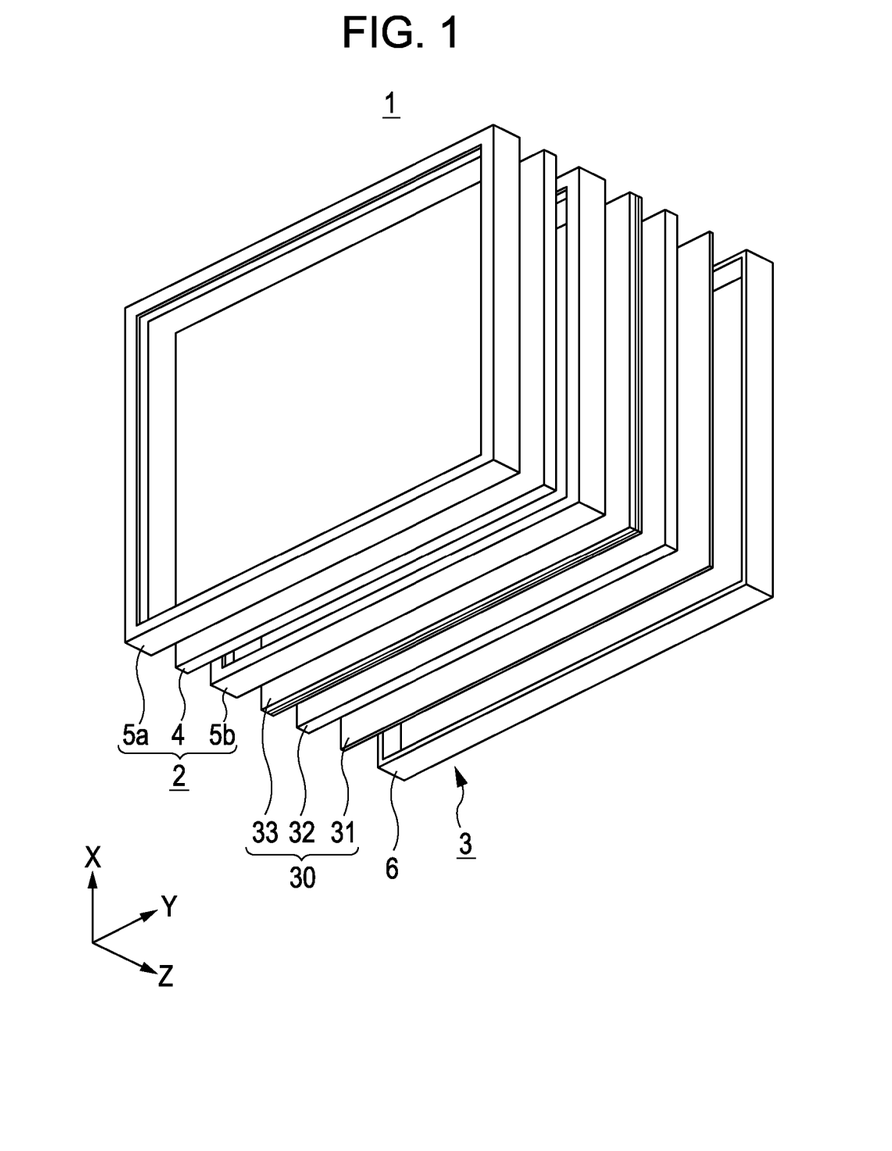
FIG. 1 is an exploded perspective view of a main portion of a transmissive liquid crystal display device according to a first embodiment of the present invention.
Figure 2:
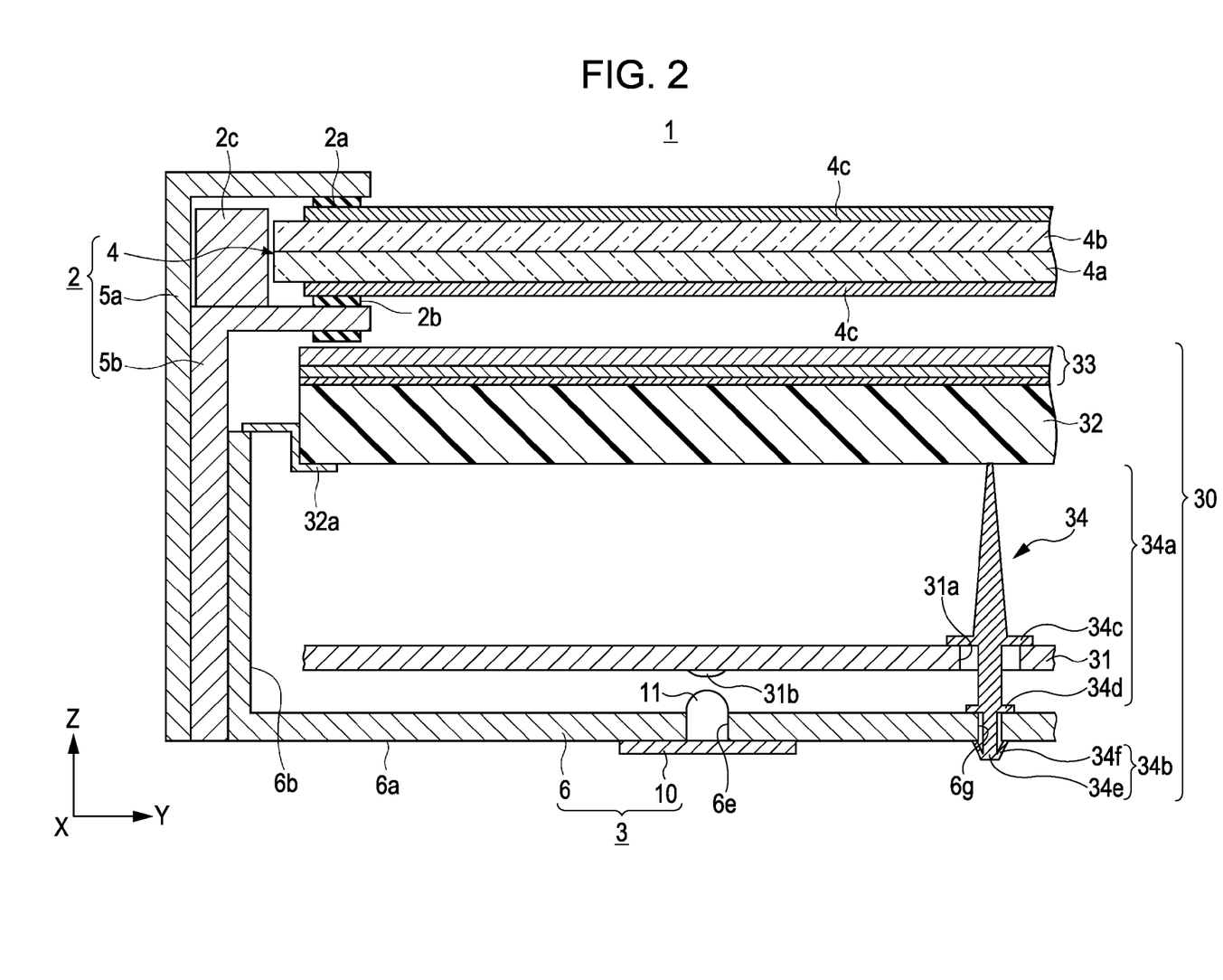
FIG. 2 is a vertical sectional view of a main portion of the transmissive liquid crystal display device according to the first embodiment of the present invention.

A liquid crystal display device 1 according to the embodiment is used in, for example, a display panel of a television receiver having a large display screen of at least 40 inches. As shown in FIGS. 1 and 2, the liquid crystal display device 1 includes a liquid crystal panel unit 2, which includes a transmissive liquid crystal panel 4, and a backlight unit 3 to which the present invention is applied, which is combined to the back surface of the liquid crystal panel unit 2 and which illuminates the liquid crystal panel unit 2 with illumination light.

The liquid crystal panel unit 2 which is illuminated by the backlight unit 3 with illumination light from its back surface includes the substantially rectangular liquid crystal panel 4, and a front frame member 5a and a back frame member 5b, which hold the liquid crystal panel 4.

As shown in FIG. 2, in the liquid crystal panel 4 held by the front frame member 5a and the back frame member 5b, a space between a first glass substrate 4a and a facing second glass substrate 4b, whose interval is maintained by, for example, a spacer bead, is filled with liquid crystals (not shown). For example, a stripe transparent electrode, an insulation film, and an alignment film that aligns liquid crystal molecules in a certain direction are provided on an inner surface of the first glass substrate 4a. In addition, for example, color filters for three primary colors of light, an overcoat layer that protects the color filters, a stripe transparent electrode, and an alignment film that aligns the liquid molecules in a certain direction are provided on an inner surface of the second glass substrate 4b. Further, optical film layers 4c, each being formed of, for example, a deflecting film and a retardation film, are provided on a surface of the first glass substrate 4a and a surface of the second glass substrate 4b, respectively.

In the liquid crystal panel 4 having the above-described structure, when the space between the first glass substrate 4a and the facing second glass substrate 4b, whose interval is maintained by, for example, a spacer bead, is filled with the liquid crystals, and voltage is applied to the transparent electrodes, the alignment films (formed of polyimide), cause the liquid crystal molecules to be aligned horizontally with respect to an interface. This causes the liquid crystal molecules to change their orientations, thereby changing light transmittance. Then, in the liquid crystal panel 4, the optical film layers 4c cause wavelength characteristics of the illumination light from the backlight unit 3 to be achromatic and white, and the color filters produce a full color, so that, for example, a predetermined color image is displayed.

The structure of the liquid crystal panel 4 is not limited to the above-described structure, so that various related structures may be used for the structure of the liquid crystal panel 4.

The front frame member 5a and the back frame member 5b, which hold the liquid crystal panel 4, each have the shape of a frame. As shown in FIG. 2, the outer peripheral edges of the liquid crystal panel 4 are held by sandwiching the liquid crystal panel 4 by the front frame member 5a and the back frame member 5b through spacers 2a and 2b and a guide member 2c.

The backlight unit 3 is combined to the back surface of the liquid crystal panel unit 2 having the above-described structure, and illuminates the liquid crystal panel unit 2 with illumination light to display, for example, a predetermined color image at the liquid crystal panel unit 2. Since the backlight unit 3 that is described in more detail below is provided at the back side of the liquid crystal display device 1, the entire surface of the liquid crystal panel unit 2 is uniformly and stably illuminated with the illumination light from the backlight unit 3. Therefore, for example, unevenness in brightness and color is reduced, so that, for example, image quality is improved.

As shown in FIG. 2, the backlight unit 3, which is combined to the back surface of the liquid crystal panel unit 2 and which emits illumination light, has an external dimension that is substantially the same as that of the back surface of the liquid crystal panel unit 2. The backlight unit 3 includes a reflecting sheet 6, a plurality of light source substrates 10, and an optical sheet block 30. The reflecting sheet 6 is combined to the back frame member 5b. The plurality of light source substrates 10 are mounted to the reflecting sheet 6 and have a plurality of light-emitting diodes (hereunder referred to as "LEDs"), serving as light sources for illumination using illumination light. The optical sheet block 30 is mounted so as to face and so as to be separated from the reflecting sheet 6, and performs an optical operation on the illumination light emitted from the light source substrates 10.

Figure 3:
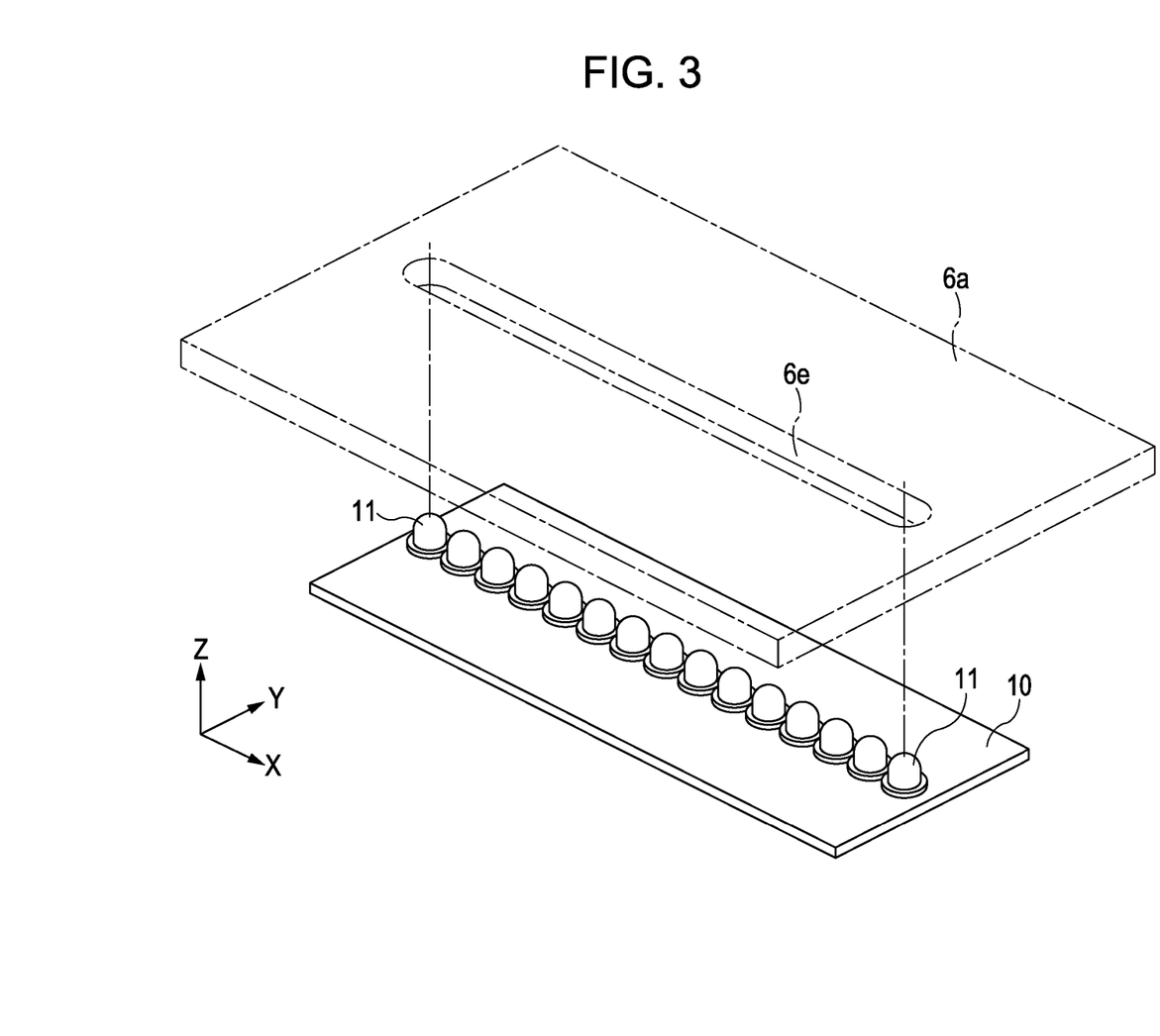
FIG. 3 is a perspective view of a main portion of an opening of a reflecting sheet and a light source substrate according to the first embodiment of the present invention.

As shown in FIG. 2, the reflecting sheet 6 having the light source substrates 10 mounted thereto includes a principal surface 6a and an outer peripheral wall 6b. The principal surface 6a is slightly larger than the external dimension of the liquid crystal panel 4 and has the form of a substantially rectangular thin plate. The outer peripheral portion of the outer peripheral wall 6b is combined to the back frame member 5b in the vicinity of the principal surface 6a. In addition, the reflecting sheet 6 includes a base 6c (see FIG. 4) and a reflecting member 6d (see FIG. 4), which are joined to each other. The base 6c is formed of an aluminum plate having mechanical rigidity. The reflecting member 6d is formed of, for example, foaming polyethylene terephthalate (PET) including a fluorescence agent and having a high reflectance characteristic. Of two principal surfaces (a first principal surface and a second principal surface) of the base 6c, the reflecting member 6d is mounted to the second principal surface that is opposite to the first principal surface to which the light source substrates 10 are mounted. Further, as shown in FIG. 3, an opening 6e is formed in the principal surface 6a of the reflecting sheet 6 so as to be in correspondence with the locations of the LEDs 11 mounted to each light source substrate 10 (described later).

The reflecting sheet 6 is not limited to one formed of an aluminum plate. It may be formed of, for example, a stainless plate having a mirror surface. When a liquid crystal display device having a relatively small size is used, the reflecting sheet 6 may be formed of, for example, the reflecting member 6d formed of foaming PET including a fluorescence agent.

Figure 4:
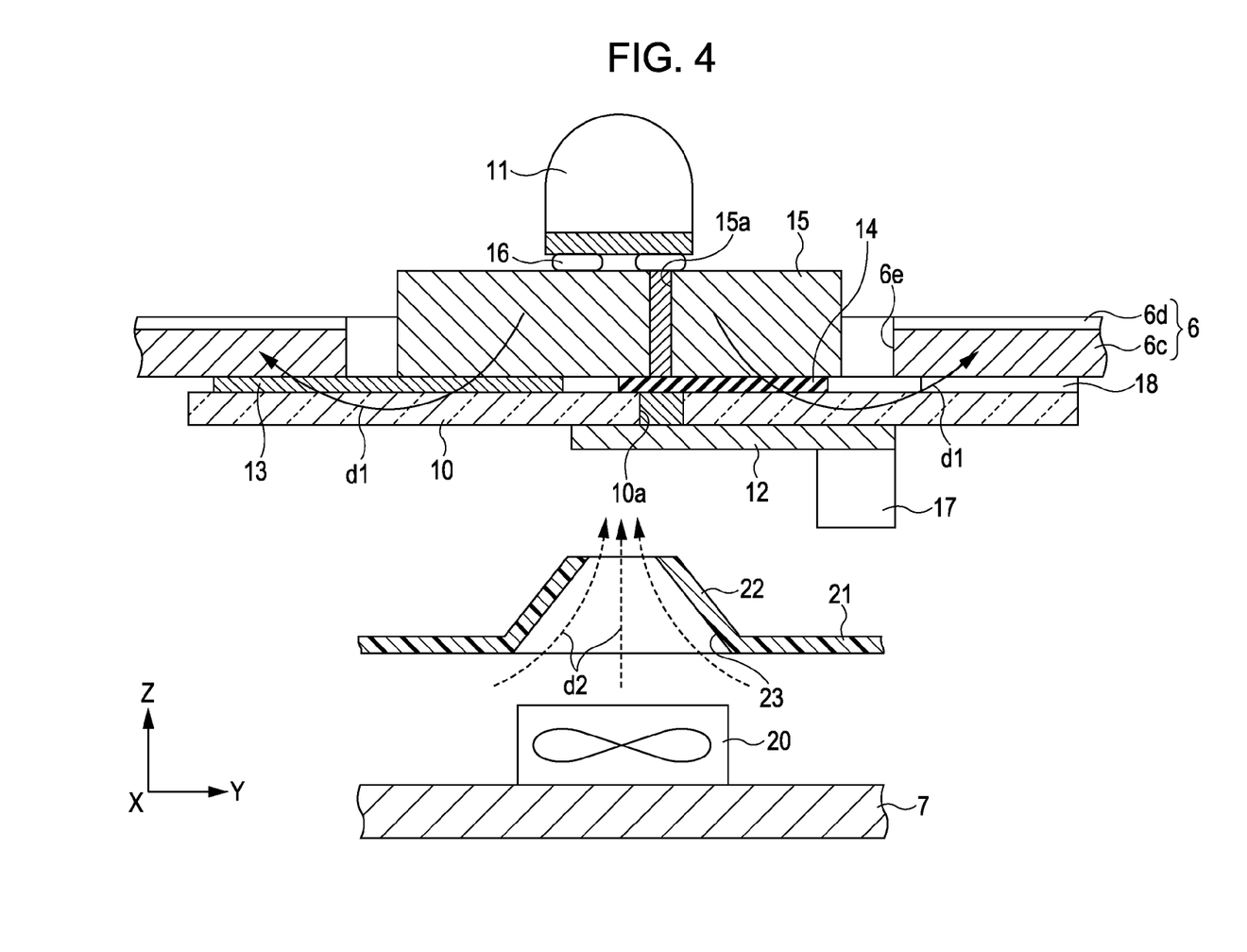
FIG. 4 is a vertical sectional view the main portion of the opening of the reflecting sheet and the light source substrate according to the first embodiment of the present invention.

As shown in FIG. 4, each light source substrate 10 mounted to the reflecting sheet 6 is a glass epoxy substrate having electrically conductive layers formed on both surfaces thereof, and has the form of a substantially rectangular thin plate that is larger than the corresponding opening 6e of the reflecting sheet 6. A wiring pattern 12, formed of an electrically conductive material, is provided on first surfaces of the light source substrates 10, and a heat-dissipating pattern 13 and a plurality of electrodes 14, which are electrically insulated from the heat-dissipating pattern 13, are substantially coaxially formed on second surfaces of the light source substrates 10 in the longitudinal direction.

A plurality of through holes 10a that electrically connect the wiring pattern 12 and each electrode 14 to each other are provided in each light source substrate 10. Each through hole 10a electrically connects the electrodes 14 and the wiring pattern 12, for example, by filling each through hole 10a with an electrically conductive paste or by through hole connection in which the inside of each through hole 10a is subjected to metal plating using, for example, gold or copper.

Using, for example, an adhesive having excellent thermal conductivity, ceramic substrates 15 are bonded and mounted to the heat-dissipating pattern 13 and the electrodes 14 on the second surfaces of the light source substrates 10. Each ceramic substrate 15 may be mounted to the electrodes 14 and the heat-dissipating pattern 13 by solder.

As shown in FIG. 4, each ceramic substrate 15 is made of a ceramic material having thermal conductivity, and is formed into the shape of a substantially circular plate or a substantially rectangular plate. In addition, the top surfaces of the ceramic substrates 15 are provided with through holes 15a formed in correspondence with the locations of the electrodes 14. The LEDs 11, which illuminate the liquid crystal panel 4 with illumination light and which are provided in correspondence with the locations of the through holes 15a, are mounted to the top surfaces of the ceramic substrates 15 by solder bumps 16. The through holes 15a electrically connect the LEDs 11, mounted to the top surfaces of the ceramic substrates 15, to the electrodes 14 of the light source substrates 10, for example, by filling the through holes 15a with an electrically conductive paste or by through hole connection in which the insides of the through holes 15a are subjected to metal plating using, for example, gold or copper.

As shown in FIG. 3, the LEDs 11 mounted to the top surfaces of the ceramic substrates 15 by the solder bumps 16 are mounted substantially coaxially in a longitudinal direction of the light source substrates 10 (similarly to the electrodes 14 and the through holes 15a) as a result of combining red LEDs, green LEDs, and blue LEDs. The electrodes 14, the through holes 15a, and the LEDs 11 may be mounted by a method other than by mounting them substantially coaxially in the longitudinal direction of the light source substrates 10.

As shown in FIG. 4, for example, a connector 17, which connects a control signal lead wire of its corresponding LED 11, is mounted to the wiring pattern 12, which is provided on the first surfaces of the light source substrates 10 and which is electrically connected to the electrodes 14 through the through holes 10a.

Each light source substrate 10 is mounted to the reflecting sheet 6 by adhering the second surface of each light source substrate 10 to one surface (or a first surface) of the reflecting sheet 6 with a thermally conductive double-faced tape 18 having excellent thermal conductivity. The openings 6e are formed in the reflecting sheet 6 in correspondence with the locations of the LEDs 11 mounted to the second surfaces of the light source substrates 10. The LEDs 11 are exposed at another surface (or a second surface) of the reflecting sheet 6 from the openings 6e. The heat-dissipating pattern 13 is provided on the second surfaces of the light source substrates 10 so as to contact the first surface of the reflecting sheet 6. The light source substrates 10 may be mounted to the reflecting sheet 6 by, for example, screwing or a snap fit.

At the light source substrates 10 having the above-described structure, the LEDs 11, which are provided on the second surfaces of the light source substrates 10, are electrically connected to the wiring pattern 12, which is provided on the first surfaces of the light source substrates 10, through the through holes 15a of the ceramic substrates 15 and the through holes 10a of the light source substrates 10.

The LEDs are mounted to the ceramic substrates 15 by the solder bumps 16, the ceramic substrates 15 are adhered to the heat-dissipating pattern 13 with an adhesive having excellent thermal conductivity, and the heat-dissipating pattern 13 is adhered to the first surface of the reflecting sheet 6 with the thermally conductive double-faced tape 18 having excellent thermal conductivity so as to contact the first surface of the reflecting sheet 6. Therefore, as indicated by the directions of arrows d1 shown in FIG. 4, the heat generated by each LED 11 is transferred to each ceramic substrate 15 having thermal conductivity, and is, then, transferred to the reflecting sheet 6 from each ceramic substrate 15 through the heat-dissipating pattern 13 and the thermally conductive double-faced tape 18.

Lenses that cover the LEDs 11 and the ceramic substrates 15 and that diffuse the illumination light emitted from the LEDs 11 may be provided at the second surface sides of the light source substrates 10. The light source substrates 10 are not limited to glass epoxy substrates, so that they may be metal-core substrates formed of, for example, aluminum.

Figure 5:
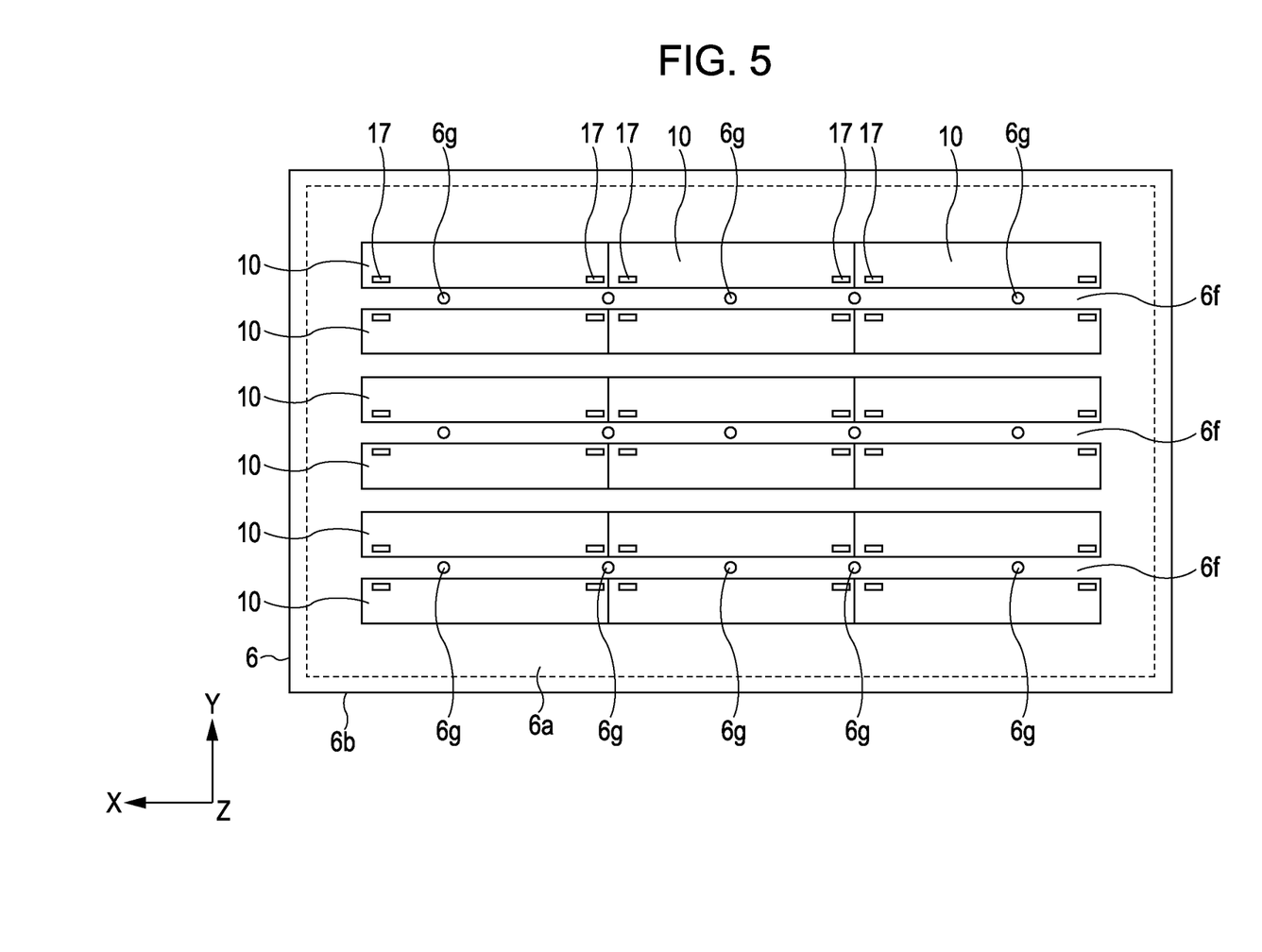
FIG. 5 is a back view of an assembly of the reflecting sheet and light source substrates according to the first embodiment of the present invention.

As shown in FIG. 5, the light source substrates 10 having the above-described structure may be arranged on the first surface of the reflecting sheet 6 in a matrix of 3 rows and 6 columns. The light source substrates 10 are arranged adjacent to each other in a row direction (that is, in the direction of arrow X shown in FIG. 5) and apart from each other in a column direction (that is, in the direction of arrow Y shown in FIG. 5). The light source substrates 10 arranged in the row direction may be electrically connected to each other by lead wires (not shown).

In addition, as shown in FIG. 5, disposition portions 6f may be provided on the reflecting sheet 6 so as to be situated between any two light source substrates 10 by arranging the light source substrates 10 apart from each other in the column direction. A plurality of insertion holes 6g in which optical studs 34 (described later) are inserted in a standing manner are formed in the disposition portions 6f. At the disposition portions 6f, a total of 15 optical studs 34 (described later) are disposed, five in each row and three in each column. Therefore, a total of 15 insertion holes 6g, five in each row and three in each column, are formed in correspondence with the locations of the optical studs 34.

As shown in FIG. 4, in an electronic apparatus 50 (such as a television receiver) in which the liquid crystal display device 1 including the backlight unit 3 according to the embodiment is installed, a housing 7, which covers the liquid crystal display device 1, and a cooling fan 20, which accelerates a cooling function of each light source substrate 10, are disposed at the first side of each light source substrate 10 of the backlight unit 3. In addition, in the electronic apparatus 50, a wind direction controlling plate 21 used to blow air blown from the cooling fan 20 of the electronic apparatus 50 onto each light source substrate 10 is disposed between the light source substrates 10 of the backlight unit 3 and the housing 7 of the electronic apparatus 50.

The wind direction controlling plate 21 is slightly larger than the principal surface 6a of the reflecting sheet 6 and has the shape of a substantially rectangular thin plate. A surface of the wind direction controlling plate 21 facing each light source substrate 10 has a plurality of protrusions 22 that are formed by a pressing operation so as to be situated in correspondence with the mounting locations of the LEDs 11 mounted to the light source substrates 10. Through holes 23 whose diameters decrease towards the side facing the light source substrates 10 are formed in the top surfaces of the respective protrusions 22. The wind direction controlling plate 21 may be formed by, for example, molding, for example, thermoplastic resin having mechanical strength.

By virtue of this structure, when air is blown into the housing 7 by the cooling fan 20, as indicated by the directions of arrows d2 shown in FIG. 4, the blown air is guided by each through hole 23 and is directly blown in a concentrated manner onto the areas where the LEDs 11 of the light source substrates 10 are mounted and onto the vicinity of these areas. Accordingly, the backlight unit 3 can efficiently cool the heat generated from the LEDs 11.

Any cooling unit other than the above-described cooling fan 20 may be disposed. Alternatively, the light source substrates 10 may be cooled by only heat dissipation of the reflecting sheet 6 without providing cooling units such as the cooling fan 20 and the wind direction controlling plate 21. In accordance with, for example, the arrangement of other components, the cooling units may be provided at the backlight unit 3 (such as the side of the light source substrates 10 where the LEDs 11 are not mounted, or the side of the reflecting sheet 6 where the light source substrates 10 are mounted), instead of at the housing 7 of the electronic apparatus 50.

As shown in FIG. 2, the optical sheet block 30 mounted to the reflecting sheet 6 is provided so as to face the back surface side of the liquid crystal panel 4. The optical sheet block 30 includes a diffusing plate 31, a diffusing-guiding plate 32, an optical-function-sheet layered body 33, and the plurality of optical studs 34.

The diffusing plate 31 faces the second surface of the reflecting sheet 6, having the light source substrates 10 mounted to the first surface thereof, at a predetermined distance from the second surface of the reflecting sheet 6, and transmits a portion of illumination light and reflects another portion of the illumination light. As shown in FIG. 2, the diffusing plate 31 is molded out of a transparent synthetic resin material, such as acryl resin, so as to be slightly larger than the liquid crystal panel 4 and have the shape of a substantially rectangular thin plate. A plurality of diffusing plate through holes 31 $a$, which receive the optical studs 34 (described later), are formed in the diffusing plate 31.

As shown in FIG. 5, a total of 15 diffusing plate through holes 31$a$ are formed, five in each row and three in each column, in accordance with the locations of the respective optical studs 34.

As shown in FIG. 2, a plurality of light control dots 31$b$ facing the plurality of LEDs 11 of the light source substrates 10, disposed in a matrix on the reflecting sheet 6, are formed in one surface (a first surface) of the diffusing plate 31 facing the light source substrates 10.

Each light control dot 31$b$ that reflects illumination light is formed by, for example, screen printing using a reflective ink in which, for example, a light-shielding agent (such as titanium oxide or barium sulfide) or a diffusing agent (such as glass powder or silicon oxide) is mixed. The light control dots 31$b$ are formed of substantially circular patterns having outside diameters that are substantially the same as or slightly larger than the outside diameters of the facing LEDs 11. The diffusing plate 31 reflects illumination light emitted from the light source substrates 10 towards the reflecting sheet 6 by the light control dots 31$b$. In addition, at an area where the light control dots 31$b$ are not formed, when an angle of incidence of the illumination light from the LEDs 11 is a critical angle with respect to the first surface of the diffusing plate 31, the illumination light is made to be incident upon the diffusing plate 31. In other words, even at the area where the light control dots 31$b$ are not formed, when the angle of incidence of the illumination light from each LED 11 is greater than the critical angle with respect to the first surface of the diffusing plate 31, and the illumination light is incident upon the diffusion plate 31, the illumination light is reflected. This causes the diffusing plate 31 to restrict by the light control dots 31$b$ the amount of incident illumination light that is incident upon the diffusing-guiding plate 32. In addition, the diffusing plate 31 repeatedly reflects the illumination light between it and the reflecting sheet 6 by the light control dots 31$b$, so that the illumination light is uniformly incident upon the entire surface of the diffusing-guiding plate 32.

The diffusing plate 31 may have dot patterns formed thereat so that a plurality of light control dots 31$b$ face one LED 11. When the illumination light is sufficiently diffused by a distribution of the illumination light from the LEDs 11, the diffusing plate 31 may be omitted.

The diffusing-guiding plate 32 faces the diffusing plate 31 at a predetermined distance from the diffusing plate 31 so as to be disposed at the side of the diffusing plate 31 that is opposite to the side of the diffusing plate 31 where the reflecting sheet 6 is provided. In addition, the diffusing-guiding plate 32 diffuses the incident illumination light in the interior thereof. Further, as shown in FIG. 2, the diffusing-guiding plate 32 is molded out of a translucent synthetic resin material capable of guiding light, such as acryl resin or polycarbonate resin, so as to have substantially the same shape as the diffusing plate 31, that is, the shape of a substantially rectangular thin plate. The diffusing-guiding plate 32 diffuses the incident illumination light from a reflecting-sheet-6-side surface (a first surface) of the diffusing-guiding plate 32 by refracting and reflecting the illumination light at the interior thereof, so that the illumination light is uniformly guided to the entire surface of the optical-function-sheet layered body 33 combined to the another surface (a second surface) of the diffusing-guiding plate 32. Further, the outer peripheral portion of the diffusing-guiding plate 32 is held by a bracket 32$a$ and mounted to the outer peripheral wall 6$b$ of the reflecting sheet 6.

The optical-function-sheet layered body 33 is combined to the diffusing-guiding plate 32 and includes a plurality of laminated optical function sheets. As shown in FIG. 2, the optical-function-sheet layered body 33 has substantially the same shape as the diffusing-guiding plate 32, that is, it is substantially rectangular. The optical function sheets are, for example, polarizing films having the capability of resolving the illumination light that is guided to the liquid crystal plate 4 from the light sources of the light source substrates 10 into orthogonal polarized light components, retardation films having the capability of providing a wide viewing angle and preventing coloration by compensating phase difference of light waves, or diffusing films having the capability of diffusing illumination light.

The optical-function-sheet layered body 33 is not limited one formed of the aforementioned optical function sheets, so that it may be formed of two diffusing sheets that are vertically provided on both sides of a retardation film or a prism sheet, or a brightness increasing film that increases brightness.

The optical studs 34 regulate an interval between the reflecting sheet 6 and the diffusing plate 31 facing each other and an interval between the diffusing plate 31 and the diffusing-guiding plate 32 facing each other. As shown in FIG. 5, the optical studs 34 are disposed in the disposition portions 6$f$ between the respective two light source substrates 10. A total of 15 optical studs 34 are disposed, five in each row in the direction of arrow X shown in FIG. 5 and three in each column in the direction of the arrow Y shown in FIG. 5. As shown in FIG. 2, the optical studs are integrally formed by highly reflecting members that are, for example, translucent or transparent, that are formed of, for example, polycarbonate resin, and that have light guiding capability, mechanically rigidity, and a certain amount of resiliency. In addition, each optical stud 34 includes a body 34$a$ and a mounting portion 34$b$. Each body 34$a$ has one end abutted against the first surface of the diffusing-guiding plate 32, and regulates the interval between the diffusing-guiding plate 32 and the reflecting sheet 6 facing each other. Each mounting portion 34$b$ is formed continuously with the base end of its corresponding body 34$a$.

As shown in FIG. 2, the one end side of each body 34$a$ has a conical form whose diameter gradually decreases towards the diffusing-guiding plate 32, and a diffusing plate regulation portion 34$c$ having a diameter that is larger than the diameter of its corresponding diffusing plate through hole 31$a$ is formed so as to protrude from the base end of the corresponding conical form. One surface of each diffusing plate regulation portion 34$c$ is in contact with the other surface (or a second surface) of the diffusing plate 31. In addition, a reflecting sheet regulation portion 34d having a diameter that is larger than the diameter of its corresponding insertion hole 6g of the reflecting sheet 6 is formed so as to protrude from the base end side of its corresponding body 34a. One surface of each reflecting sheet regulation portion 34d is in contact with the second surface of the reflecting sheet 6.

As shown in FIG. 2, each mounting portion 34b, formed continuously with the base end of its corresponding body 34a, includes a support shaft 34e and a supporting member 34f. Each support shaft 34e is formed integrally with the corresponding body 34a, and is inserted into the corresponding hole 6g of the reflecting sheet 6. Each supporting member 34f is formed so as to protrude from its corresponding support shaft 34e towards the outer peripheral portion of the base end of the support shaft 34e. One end of each supporting member 34f has a diameter that is larger than the diameter of its corresponding insertion hole 6g. The one end side of each supporting member 34f is supported in the vicinity of one surface side defining its corresponding insertion hole 6g. Each supporting member 34f is resilient. When the one end of each supporting member 34f having a diameter that is larger than the diameter of its corresponding insertion hole 6g is pressed in a radial direction, it temporarily becomes smaller than its corresponding insertion hole 6g, so that it can be removed from the reflecting sheet 6.

Here, a method of assembling the backlight unit 3 will be described.

Ceramic substrates 15 are mounted by adhering them to a heat-dissipating pattern 13 and electrodes 14 of light source substrates 10 that already have a wiring pattern 12 formed on their first surfaces and the heat-dissipating pattern 13 and the electrodes 14 formed on their second surfaces. For example, an adhesive having excellent thermal conductivity is used for adhering the ceramic substrates 15. A plurality of LEDs 11 are mounted to the top surfaces of the ceramic substrates 15 by solder bumps 16. Then, the light source substrates 10 having the LEDs 11 mounted thereto are arranged in a matrix in three rows and six columns on a first surface of the reflecting sheet 6, and are mounted thereto with a thermally conductive double-faced tape 18 having excellent thermal conductivity.

As shown in FIG. 2, a diffusing plate 31 is disposed at diffusing plate supporting portions (not shown) provided in the vicinity of the reflecting sheet 6. Then, insertion holes 6g of the reflecting sheet 6 are made to face the diffusing plate through holes 31a formed in correspondence with the locations of the insertion holes 6g.

Mounting portions 34b of optical studs 34 are pushed into the respective insertion holes 6g through the diffusing plate through holes 31a of the diffusing plate 31 from a second surface side of the reflecting sheet 6. When the mounting portions 34b of the optical studs 34 pass through the insertion holes 6g, the diameters of supporting members 34f are reduced. By pushing the mounting portions 34b so that the diameters of the supporting members 34f are increased to their original large diameters by their resiliency after passing the mounting portions 34b through the insertion holes 6g, end surfaces of the supporting members 34f are supported in the vicinity of one side of the through holes 6g.

At this time, the end surface of each supporting member 34f is supported in the vicinity of the one side of its corresponding through hole 6g of the reflecting sheet 6, and each reflecting sheet regulation portion 34d is in contact the second surface of the reflecting sheet 6, so that each optical stud 34 is mounted to the reflecting sheet 6. By disposing the diffusing plate regulation portions 34c and the diffusing plate supporting portions (not shown), provided in the vicinity of the reflecting sheet 6, on both sides of the diffusing plate 31 in a thickness direction (a Z direction), the optical studs 34 regulate the interval between the reflecting sheet 6 and the diffusing plate 31 facing each other. Accordingly, the parallelism between facing principal surfaces thereof is set with high precision over the entire principal surfaces.

One surface of the diffusing-guiding plate 32 is brought into contact with ends of the optical studs 34 and is mounted to an outer peripheral wall 6b of the reflecting sheet 6 using a bracket 32a.

At this time, the end of each optical stud 34 is brought into contact with and abutted against a point or a narrow area of the one surface of the diffusing-guiding plate 32, and the diffusing plate regulation portion 34c of each optical stud 34 is brought into contact with a regulation-portion-facing surface of the diffusing plate 31. Accordingly, the interval between the diffusing-guiding plate 32 and the diffusing plate 31 facing each other is regulated, so that the parallelism between facing principal surfaces thereof is set with high precision over the entire principal surfaces.

In the backlight unit 3 having the above-described structure, the reflecting sheet 6 is formed by joining a reflecting member 6d including a fluorescence agent and having high reflectivity to a reflecting-member-facing surface of an aluminum plate base 6c having mechanical rigidity. Therefore, the reflecting sheet 6 functions as a basic structure of the backlight unit 3 due to its mechanical rigidity, and can reflect illumination light from each LED 11 and illumination light reflected by the diffusing plate 31 towards the diffusing plate 31 by the reflecting member 6d on the second surface of the reflecting sheet 6. In other words, the combination of the reflecting sheet and the back chassis of the backlight device in Patent Document 1 can be replaced by one reflecting sheet 6 according to the embodiment of the present invention. Therefore, when a plurality of light source substrates 10 having LEDs 11 mounted thereto are mounted to the first surface of the reflecting sheet 6, it is possible to simplify the structure of the backlight unit 3, reduce the number of parts thereof, and reduce the weight of the backlight unit 3.

In the backlight unit 3, the LEDs 11, mounted to the top surfaces of the ceramic substrates 15 and provided at the second surface sides of the light source substrates 10, are electrically connected to the wiring pattern 12, provided at the first surfaces of the light source substrates 10, through the through holes 15a of the ceramic substrates 15 and the through holes 10a of the light source substrates 10. Therefore, it is possible to mount the wiring pattern 12, and wiring parts, such as connectors 17 or harnesses, to the first surfaces of the light source substrates 10, so that it is possible to increase the degree of wiring design freedom.

Further, in the backlight unit 3, as indicated by the directions of arrows d1 shown in FIG. 4, heat generated by the LEDs 11 is transferred to the ceramic substrates 15. Then, from the ceramic substrates 15, the heat is transferred to the reflecting sheet 6 through the heat-dissipating pattern 13 and the thermally conductive double-faced tape 18. Then, the heat is dissipated by the reflecting sheet 6, so that the light source substrates 10 can be cooled.

In the backlight unit 3, since a plurality of light source substrates 10 having LEDs 11 mounted thereto are mounted to the first surface of the reflecting sheet 6, it is possible to dispose cooling units at the first surface side of the light source substrates 10. In addition, it is possible to directly cool the first surface of each light source substrate 10 by the cooling units disposed at the first surface side of the light source substrates 10. Therefore, the backlight unit 3 can efficiently cool the heat generated from each LED 11 by a simple structure as a result of dissipating the heat generated from each LED 11 by the reflecting sheet 6 and directly cooling the first surface of each light source substrate 10 by the cooling units.

Further, in the backlight unit 3, since each light source substrate 10 is cooled by heat dissipation by the reflecting sheet 6 and by being directly cooled by the cooling fan 20, using a general-purpose glass epoxy substrate for each light source substrate 10 makes it possible to increase productivity and reduce costs.

Second Embodiment

A second embodiment according to the present invention will be described. Structural portions in the second embodiment corresponding to those in the first embodiment will be given the same reference numerals, and descriptions thereof will be either omitted or simplified.

Figure 6:
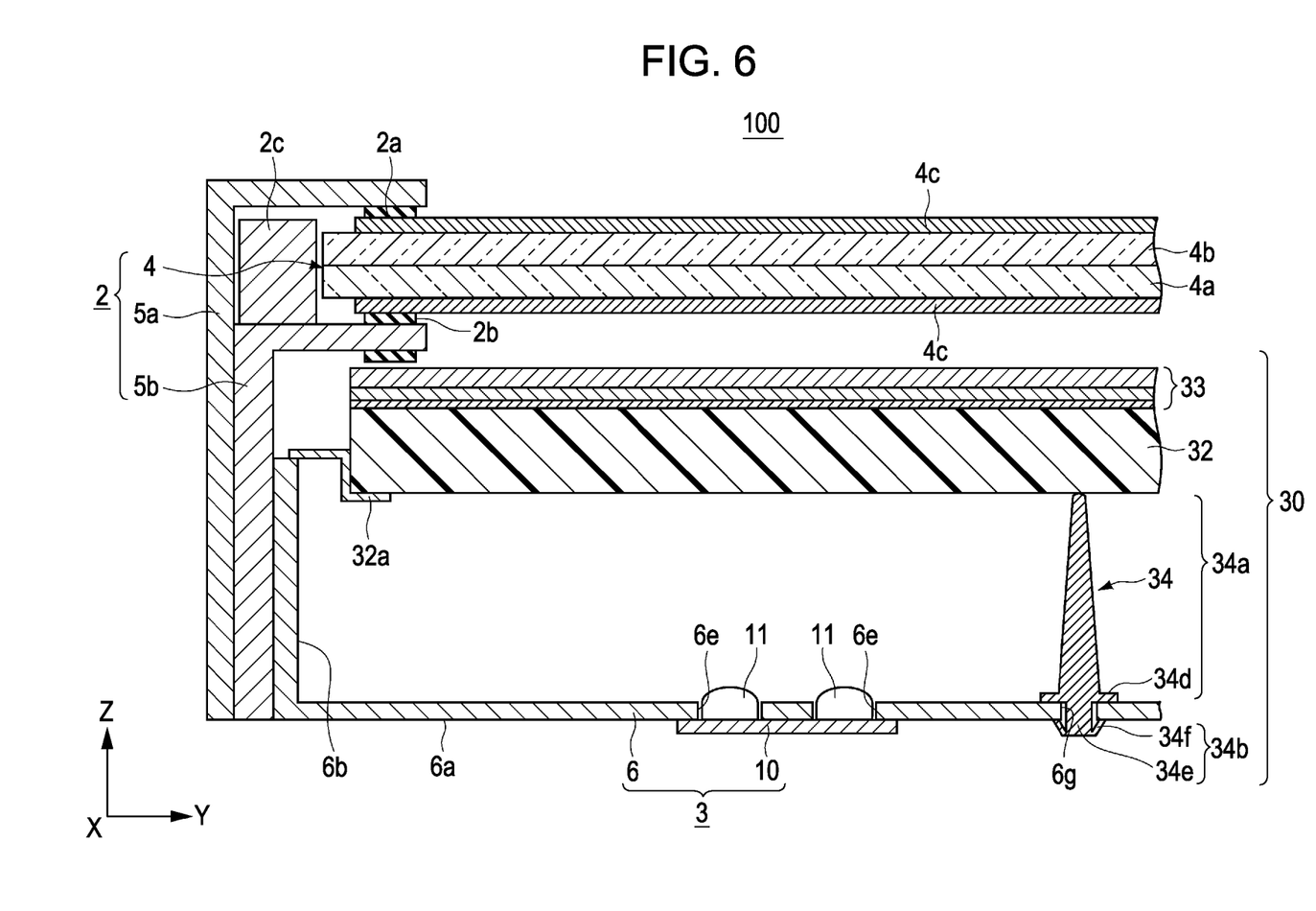
FIG. 6 is a vertical sectional view of a main portion of a liquid crystal display device according to a second embodiment of the present invention.
Figure 7:
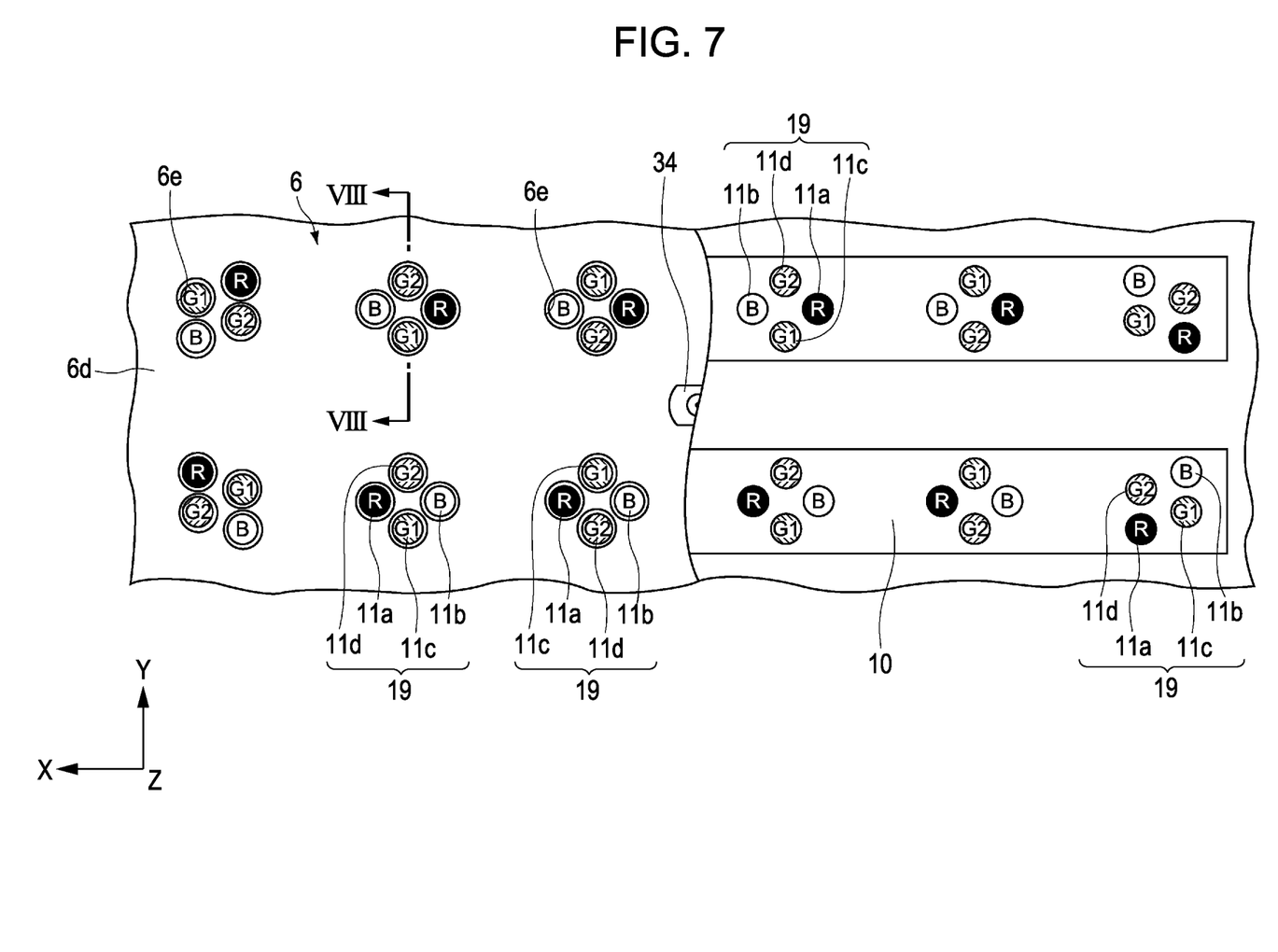
FIG. 7 is a cutaway plan view of a main portion of a reflecting sheet and light source substrates according to the second embodiment of the present invention.
Figure 8:
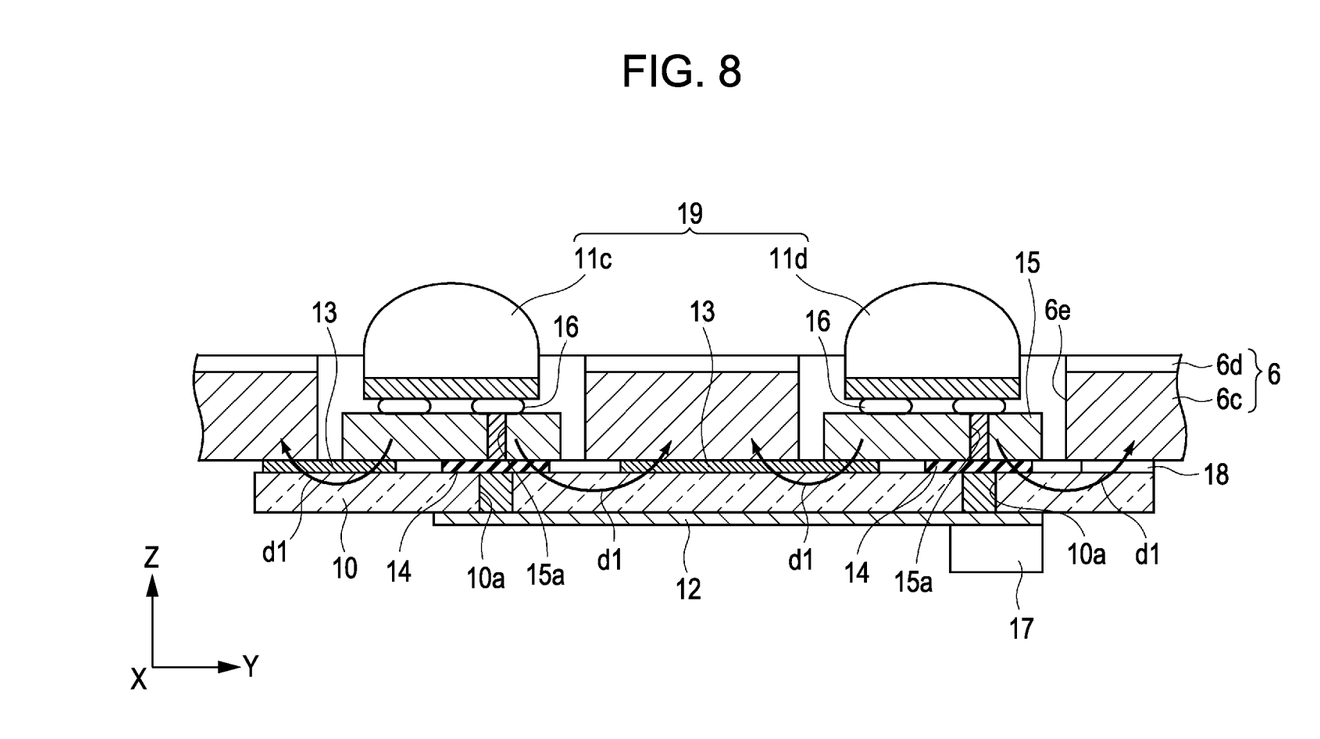
FIG. 8 is a sectional view taken along line VIII-VIII of openings of the reflecting sheet and the light source substrates shown in FIG. 7.

FIG. 6 is a vertical sectional view of a main portion of a liquid crystal display device 100 according to the second embodiment. FIG. 7 is a cutaway plan view of a main portion of a reflecting sheet 6 and light source substrates 10 according to the second embodiment. FIG. 8 is a vertical sectional view taken along line VIII-VIII of openings 6e of the reflecting sheet 6 and the light source substrates 10 shown in FIG. 7.

As shown in FIG. 6, the liquid crystal display device 100 according to the second embodiment differs from the liquid crystal display device 1 according to the first embodiment shown in, for example, FIG. 2, in that the liquid crystal display device 100 does not include a diffusing plate 31. That is, the liquid crystal display device 100 is constructed so that the reflecting sheet 6 and a diffusing-guiding plate 32 directly face each other. Therefore, at each optical stud 34, a diffusing plate regulation portion 34c like that shown in FIG. 2 is not provided, and a body 34a has a substantially conical form from an end where it contacts the diffusing-guiding plate 32 to a corresponding reflecting sheet regulation portion 34d. By omitting the diffusing plate 31, it is possible to further reduce the thickness, weight, and costs of the liquid crystal display device 100.

Unlike the first embodiment in which each LED 11 is mounted in a straight line on each light source substrate 10 as shown in FIG. 3, in the second embodiment, each LED 11 is mounted in the shape of a cross as shown in FIGS. 6 to 8 instead of in a straight line.

More specifically, as shown in FIG. 7, a plurality of LED units 19 (for example, six LED units 19), each being formed by disposing four LEDs 11 close to each other in an X direction and a Y direction, are provided on the respective light source substrates 10 at a predetermined interval (for example, 60 mm) in the longitudinal direction (the X direction) of the light source substrates 10. However, for the left end and right end LED units 19, their LEDs 11 are obliquely shifted from each other, instead of being disposed in the shape of a cross in the X direction and the Y direction. In addition, for the left and right LED units 19, the LEDs 11 are symmetrically disposed. The light source substrates 10 that are adjacent to each other in the Y direction are disposed in states that are reversed 180 degrees with respect to each other.

Each LED unit 19 includes, for example, one red LED 11a and one blue LED 11b that are disposed in a line in the X direction and two green LEDs 11c and 11d that are disposed in a line in the Y direction. Therefore, in the second embodiment, the number of LED units is 6×4×12=288, and the number of LEDs 11 is 4×288=1152. The number of LED units 19 and LEDs 11 and the intervals between the LED units 19 and between the LEDs 11 are not limited to those mentioned above. Accordingly, for example, the size of a liquid crystal panel 4 and light-emitting capability of the LEDs 11 may be changed as appropriate.

In the embodiment, since each LED 11 is not provided in a straight line, each opening 6e of the reflecting sheet 6 is not formed in a straight line as it is in FIG. 3. Instead, as shown in FIG. 7, each opening 6e is formed in, for example, a cylindrical form for every LED 11, and allows its corresponding LED 11 to be exposed from a surface of the reflecting surface 6 where a reflecting member 6d is provided.

As shown in FIG. 7, the two green LED 11c (G1) and green LED 11d (G2) on each light source substrate 10 have different chromaticities, and are formed so the average chromaticity of the LEDs 11c and 11d becomes a predetermined chromaticity. That is, as long as the average chromaticity is a predetermined chromaticity, it is possible to combine green LEDs having any chromaticities. By virtue of such a structure, it is possible to absorb variations in the green LEDs having particularly large variations among the color LEDs.

The green LEDs 11c and green LEDs 11d (G1 and G2) are disposed in a zigzag form along the X direction. In other words, the vertical positions of the green LEDs 11c and 11d of the LED units 19 are alternately interchanged in the X direction.

As mentioned above, the light source substrates 10 that are adjacent to each other in the Y direction are disposed in states that are reversed with respect to each other. Therefore, when the green LEDs 11c and 11d having difference chromaticities are disposed in a straight line in the X direction, the green LEDs 11c (G1) having the same chromaticity as well as the green LEDs 11d (G2) having the same chromaticity are provided close to each other at the light source substrates 10 that are adjacent to each other in the Y direction. This results in unevenness in color and brightness. However, when the green LEDs 11c and 11d are disposed in a zigzag form as in the embodiment, the LEDs G1 can be uniformly disposed so that the LEDs G1 are not close to each other and the LEDs G2 can also be uniformly disposed so that the LEDs G2 are not close to each other, at the light source substrates 10 that are adjacent to each other in the Y direction. Therefore, it is possible to reduce unevenness in color and brightness.

The green LEDs 11c and 11d may have different brightnesses in addition to different chromaticities. In this case, as long as the average brightness of the green LEDs 11c and 11d is a predetermined brightness, it is possible to combine green LEDs having any brightnesses.

In addition to the green LEDs 11c and 11d, red LEDs 11a and blue LEDs 11b may be mounted in the LED units 19 so that average chromaticities (or average brightnesses) of the red LEDs 11a and the blue LEDs 11b are predetermined chromaticities (or predetermined brightnesses).

As shown in FIG. 8, similarly to the first embodiment, in the second embodiment, the LEDs 11 are provided on ceramic substrates 15, having through holes 15a, through solder bumps 16. However, since the LEDs 11 are not provided in a straight line in the second embodiment as mentioned above, electrodes 14, a heat-dissipating pattern 13, and a wiring pattern 12 are not provided in a straight line in correspondence with the positions of the LEDs 11. For example, the heat-dissipating pattern 13 provided between the LEDs 11c and 11d is formed so as to dissipate heat of the LEDs 11c and 11d. However, below the ceramic substrates 15 where the LEDs 11a and 11b (see FIG. 7) exist in the X direction in FIG. 8, the heat-dissipating pattern 13 is formed specially for dissipating heat of the LEDs 11a and 11b. Even in this structure, the heat generated from each LED 11 can be efficiently dissipated from the reflecting sheet 6 through, for example, paths in the directions of arrows d1 in FIG. 8. In addition, the light source substrates 10 also have through holes 10a provided in correspondence with the LEDs 11. Therefore, the electrodes 14 for the LEDs 11 and the wiring pattern 12, formed in correspondence with the positions of the LEDs 11, are electrically connected to each other.

In addition, in the second embodiment, the cooling fan 20 and the wind direction controlling plate 21 provided in the first embodiment are omitted. This makes it possible to further reduce the thickness, weight, and costs of the liquid crystal display device 100. However, the present invention is not limited to this structure, so that cooling units like those used in the first embodiment may be provided at an electronic apparatus or a backlight unit.

According to the first and second embodiments described above, using a general-purpose printed wiring substrate for each light source substrate makes it possible to increase productivity and reduce costs.

By mounting a plurality of light source substrates having light sources to the first surface of the reflecting sheet, it is possible to mount wiring parts, such as connectors or harnesses, to the first surfaces of the light source substrates that are opposite to the reflecting sheet. Therefore, it is possible increase the degree of design freedom.

The present invention is not limited to the above-described embodiments, so that various modifications may obviously be made within a scope not departing from the gist of the present invention.

In each of the embodiments, the light source substrates 10 are mounted to the first surface of the reflecting sheet 6 so that each light source substrate 10 protrudes from the first surface by an amount corresponding to its Z-direction thickness and the thickness of each connector 17. However, it is possible to, for example embed each light source substrate 10 in a recess that is formed in the first surface of the reflecting sheet 6 in correspondence with the form and thickness of each light source substrate 10. In this case, each connector 17 may also be embedded in the first surface of the reflecting sheet 6 so as not to protrude from the first surface of the reflecting sheet 6. Further, a supporting member 34f of each optical stud 34 may also be embedded in the first surface of the reflecting sheet 6. This makes it possible further reduce the thickness of the liquid crystal display device.

Although, in each of the above-described embodiments, the liquid crystal display device is applied to a television receiver, it may obviously be applied to other electronic apparatuses, such as a personal computer (PC) or an outdoor large display apparatus.

What is claimed is:

1. A backlight device that illuminates a transmissive liquid crystal panel from a rear surface side thereof, the backlight device comprising:
   a plurality of light source substrates having a plurality of light-emitting elements for emitting illumination light;
   a reflecting sheet having the plurality of light source substrates mounted directly to one surface of the reflecting sheet, the reflecting sheet having an opening formed at a location in correspondence with the light-emitting elements mounted to the light source substrates, the reflecting sheet allowing the light-emitting elements to be exposed at another surface of the reflecting sheet from the opening and reflecting the illumination light from the light-emitting elements by said another surface;
   a diffusing-guiding plate facing said another surface of the reflecting sheet at a predetermined interval from the reflecting sheet, the diffusing-guiding plate diffusing in a layer thereof the illumination light incident from the reflecting sheet; and
   an optical-function-sheet layered body that is combined with the diffusing-guiding plate, that includes a plurality of laminated optical function sheets, and that guides the illumination light to the transmissive liquid crystal panel;
   wherein a wiring pattern is disposed in direct contact with surfaces of the light source substrates at a first side of the light source substrates that is furthest from the light-emitting elements, and a heat-dissipating pattern is disposed in direct contact with surfaces of the light source substrates at a second side of the light source substrates, the second side being furthest from the wiring pattern.

2. The backlight device according to claim 1, wherein each light source substrate is a glass epoxy substrate.

3. The backlight device according to claim 1, wherein the wiring pattern is connected to a land that is disposed at the surface of each light source substrate at said second side through a through hole.

4. The backlight device according to claim 3, wherein a connector or a harness is mounted to the surface of each light source substrate at said first side of the corresponding light source substrate.

5. A backlight device that supplies illumination light to a transmissive liquid crystal panel, the backlight device comprising:
   a plurality of light source substrates having a plurality of light-emitting elements for emitting the illumination light;
   a reflecting sheet having a first surface, a second surface, and a plurality of openings, the first surface having the plurality of light source substrates provided thereon, wherein the plurality of light source substrates are attached to and held by the first surface of the reflecting sheet, the second surface being disposed opposite to the first surface and reflecting the illumination light emitted from the plurality of light-emitting elements, the openings connecting the first and second surfaces and being disposed in correspondence with the light-emitting elements so as to allow the light-emitting elements to be exposed from the second surface;
   a diffusing-guiding plate provided so as to directly face the second surface of the reflecting sheet at a predetermined distance from the second surface, the diffusing-guiding plate diffusing the illumination light emitted from the light-emitting elements and the illumination light incident from the second surface of the reflecting sheet in an interior of the diffusing-guiding plate; and
   an optical-function-sheet layered body that is combined with the diffusing-guiding plate, that includes a plurality of laminated optical function sheets, and that guides the illumination light to the transmissive liquid crystal panel;
   wherein a wiring pattern is disposed in direct contact with surfaces of the light source substrates at a first side of the light source substrates that is furthest from the light-emitting elements, and a heat-dissipating pattern is disposed in direct contact with surfaces of the light source substrates at a second side of the light source substrates that is opposite the first side.

6. A liquid crystal display device comprising:
   a transmissive liquid crystal panel; and
   a backlight device that illuminates the transmissive liquid crystal panel from a rear surface side thereof,
   wherein,
   the backlight device includes a plurality of light source substrates having a plurality of light-emitting elements for emitting illumination light, a reflecting sheet having the plurality of light source substrates mounted directly to one surface of the reflecting sheet, the reflecting sheet having an opening formed at a location in correspondence with the light-emitting elements mounted to the light source substrates, the reflecting sheet allowing the light-emitting elements to be exposed at another surface of the reflecting sheet from the opening, and reflecting the illumination light from the light-emitting elements by said another surface, a diffusing-guiding plate facing said another surface side of the reflecting sheet at a predetermined interval from the reflecting sheet, the diffusing-guiding plate diffusing in a layer thereof the illumination light incident from the reflecting sheet, and an optical-function-sheet layered body that is combined with the diffusing-guiding plate, that includes a plurality of laminated optical function sheets, and that guides the illumination light to the transmissive liquid crystal panel;

wherein a wiring pattern is disposed in direct contact with surfaces of the light source substrates at a first side of the light source substrates that is furthest from the light-emitting elements, and a heat-dissipating pattern is disposed in direct contact with surfaces of the light source substrates at a second side of the light source substrates, the second side being furthest from the wiring pattern.

7. The liquid crystal display device according to claim 6, wherein the wiring pattern is connected to a land that is disposed at the surface of each light source substrate at said second side, through a through hole.

8. A liquid crystal display device comprising:
a transmissive liquid crystal panel; and
a backlight device that supplies illumination light to the transmissive liquid crystal panel, wherein,
the backlight device includes a plurality of light source substrates having a plurality of light-emitting elements for emitting the illumination light,
a reflecting sheet having a first surface, a second surface, and a plurality of openings, the first surface having the plurality of light source substrates provided thereon, wherein the plurality of light source substrates are attached to and held by the first surface of the reflecting sheet, the second surface being disposed opposite to the first surface and reflecting the illumination light emitted from the plurality of light-emitting elements, the openings connecting the first and second surfaces and being disposed in correspondence with the light-emitting elements so as to allow the light-emitting elements to be exposed from the second surface,
a diffusing-guiding plate provided so as to directly face the second surface of the reflecting sheet at a predetermined distance from the second surface, the diffusing-guiding plate diffusing the illumination light emitted from the light-emitting elements and the illumination light incident from the reflecting sheet in an interior of the diffusing-guiding plate, and
an optical-function-sheet layered body that is combined with the diffusing-guiding plate, that includes a plurality of laminated optical function sheets, and that guides the illumination light to the transmissive liquid crystal panel;
wherein a wiring pattern is disposed in direct contact with surfaces of the light source substrates at a first side of the light source substrates that is furthest from the light-emitting elements, and a heat-dissipating pattern is disposed in direct contact with surfaces of the light source substrates at a second side of the light source substrates that is opposite the first side.

9. The liquid crystal display device according to claim 8, wherein the wiring pattern is connected to a land that is disposed at the surface of each light source substrate at said second side, through a through hole.

10. An electronic apparatus comprising:
a transmissive liquid crystal panel;
a backlight device; and
cooling means for cooling a plurality of light source substrates,
wherein,
the backlight device includes the plurality of light source substrates having a plurality of light-emitting elements for emitting illumination light that is supplied to the transmissive liquid crystal panel,
a reflecting sheet having a first surface, a second surface, and a plurality of openings, the first surface having the plurality of light source substrates provided thereon, wherein the plurality of light source substrates are attached to and held by the first surface of the reflecting sheet, the second surface being disposed opposite to the first surface and reflecting the illumination light emitted from the plurality of light-emitting elements, the openings connecting the first and second surfaces and being disposed in correspondence with the light-emitting elements so as to allow the light-emitting elements to be exposed from the second surface,
a diffusing-guiding plate provided so as to directly face the second surface of the reflecting sheet at a predetermined distance from the second surface, the diffusing-guiding plate diffusing the illumination light emitted from the light-emitting elements and the illumination light incident from the reflecting sheet in an interior of the diffusing-guiding plate, and
an optical-function-sheet layered body that is combined with the diffusing-guiding plate, that includes a plurality of laminated optical function sheets, and that guides the illumination light to the transmissive liquid crystal panel,
wherein a heat-dissipating pattern is disposed in direct contact with only a first side of the plurality of light source substrates that is closest to the light-emitting elements.

11. An electronic apparatus comprising:
a transmissive liquid crystal panel;
a backlight device; and
a cooling unit that cools a plurality of light source substrates,
wherein,
the backlight device includes the plurality of light source substrates having a plurality of light-emitting elements for emitting illumination light that is supplied to the transmissive liquid crystal panel,
a reflecting sheet having a first surface, a second surface, and a plurality of openings, the first surface having the plurality of light source substrates provided thereon, wherein the plurality of light source substrates are attached to and held by the first surface of the reflecting sheet, the second surface being disposed opposite to the first surface and reflecting the illumination light emitted from the plurality of light-emitting elements, the openings connecting the first and second surfaces and being disposed in correspondence with the light-emitting elements so as to allow the light-emitting elements to be exposed from the second surface, a diffusing-guiding plate provided so as to directly face the second surface of the reflecting sheet at a predetermined distance from the second surface, the diffusing-guiding plate diffusing the illumination light emitted from the light-emitting elements and the illumination light incident from the reflecting sheet in an interior of the diffusing-guiding plate, and an optical-function-sheet layered body that is combined with the diffusing-guiding plate, that includes a plurality of laminated optical function sheets, and that guides the illumination light to the transmissive liquid crystal panel, wherein a heat-dissipating pattern is disposed between the reflecting sheet and the plurality of light source substrates, and wherein the heat-dissipating pattern is in contact with the plurality of light source substrates only on a first side of the light source substrates that is opposite the first surface of the reflecting sheet.

12. The electronic apparatus according to claim 10, further comprising:
a wiring pattern disposed on a rear surface of the light source substrates,
wherein the cooling means is in direct communication with the wiring pattern and the rear surface of the light source substrates such that air generated by the cooling means is directly incident thereon.

13. The electronic apparatus according to claim 11, further comprising:
a wiring pattern disposed on a rear surface of the light source substrates,
wherein the cooling unit is in direct communication with the wiring pattern and the rear surface of the light source substrates such that air generated by the cooling unit is directly incident thereon.

14. The liquid crystal display device according to claim 9, further comprising:
cooling means provided in direct communication with a rear surface and the wiring pattern of the light source substrates such that air generated by the cooling means is directly incident thereon.

15. The backlight device according to claim 3, wherein the heat-dissipating pattern conducts heat from the light-emitting elements to the light source substrates, and from the light source substrates to the heat-dissipating pattern, and from the heat-dissipating pattern to a thermally conductive tape, and from the thermally conductive tape to the reflecting sheet.

16. The backlight device according to claim 1, wherein the light-emitting elements are connected to the second side of the light source substrates using a plurality of solder bumps.

17. The backlight device according to claim 16, wherein:
a first one of the plurality of solder bumps is electrically connected to the wiring pattern by a land disposed in a through hole in the light source substrates, and
a second one of the plurality of the solder bumps is thermally connected to the heat-dissipating pattern.

18. The backlight device according to claim 1,
wherein a cooling means is in direct communication with the wiring pattern and the first side of the light source substrates such that air generated by the cooling means is directly incident thereon.

19. The backlight device according to claim 1, wherein the heat-dissipating pattern is between the plurality of light source substrates and the reflecting sheet, the reflecting sheet is in contact with an upper side of the heat-dissipating pattern, and the plurality of light source substrates in contact with a lower side of the heat-dissipating pattern.

20. The electronic apparatus according to claim 11, wherein the heat-dissipating pattern is between the plurality of light source substrates and the reflecting sheet, the reflecting sheet is in contact with an upper side of the heat-dissipating pattern, and the plurality of light source substrates is in contact with a lower side of the heat-dissipating pattern.

* * * * *